US010769651B2

(12) United States Patent
Mathur et al.

(10) Patent No.: US 10,769,651 B2
(45) Date of Patent: Sep. 8, 2020

(54) ESTIMATING PROSPECT LIFETIME VALUES

(71) Applicant: Tata Consultancy Services Limited, Mumbai (IN)

(72) Inventors: Raghav Mathur, Bangalore (IN); Swaroop Krothapalli, Tadepalli (IN)

(73) Assignee: Tata Consultancy Services Limited, Mumbai (IN)

( * ) Notice: Subject to any disclaimer, the term of this patent is extended or adjusted under 35 U.S.C. 154(b) by 1008 days.

(21) Appl. No.: 15/014,344

(22) Filed: Feb. 3, 2016

(65) Prior Publication Data
US 2017/0068977 A1 Mar. 9, 2017

(30) Foreign Application Priority Data
Sep. 3, 2015 (IN) .......................... 762/MUM/2015

(51) Int. Cl.
*G06Q 30/02* (2012.01)
*G06F 16/2457* (2019.01)

(52) U.S. Cl.
CPC ... *G06Q 30/0205* (2013.01); *G06F 16/24578* (2019.01); *G06Q 30/0201* (2013.01)

(58) Field of Classification Search
CPC ............ G06Q 30/0205; G06Q 30/0201; G06F 16/24578
USPC ....................................................... 705/7.34
See application file for complete search history.

(56) References Cited

U.S. PATENT DOCUMENTS

| 7,698,163 B2 | 4/2010 | Reed et al. | |
|---|---|---|---|
| 8,504,408 B2 | 8/2013 | Banthia et al. | |
| 2002/0099594 A1* | 7/2002 | Heard .................. | G06Q 20/10 706/12 |
| 2004/0039688 A1* | 2/2004 | Sulkowski ............ | G06Q 40/02 705/38 |
| 2004/0103017 A1* | 5/2004 | Reed .................. | G06Q 10/0637 705/7.31 |
| 2009/0327296 A1* | 12/2009 | Francis ................. | G06F 16/00 |
| 2010/0100420 A1* | 4/2010 | Anderson ............. | G06Q 30/02 705/7.33 |

(Continued)

*Primary Examiner* — Eric W Stamber
*Assistant Examiner* — George H Walker, III
(74) *Attorney, Agent, or Firm* — Finnegan, Henderson, Farabow, Garrett & Dunner LLLP (57) ABSTRACT

The disclosure relates generally to estimating lifetime values, and more particularly to estimating Prospect Lifetime Values (PLTVs) for prospective customers for an organization. In one example, for estimating PLTV for a prospective customer, a distance of the prospective customer from each of existing customers of the organization is computed using existing customer data and prospective customer data. The existing customer data includes at least one of existing customer demographic variables and existing customer profile variables. Further, the prospective customer data includes at least one of prospective customer demographic variables and prospective customer profile variables. Subsequently, for the prospective customer, a pre-defined number of existing customers are determined from amongst the plurality of existing customers based on the distance. Thereafter, PLTV for the prospective customer is estimated using an average of Customer Lifetime Values (CLTVs) for the determined existing customers.

9 Claims, 2 Drawing Sheets

(56) References Cited

U.S. PATENT DOCUMENTS

| | | | |
|---|---|---|---|
| 2014/0278798 A1* | 9/2014 | Goyal | G06Q 30/0204 |
| | | | 705/7.33 |
| 2014/0289007 A1* | 9/2014 | Bhattacharya | G06Q 30/0202 |
| | | | 705/7.31 |
| 2015/0142521 A1* | 5/2015 | Aydin | G06Q 30/0204 |
| | | | 705/7.33 |
| 2015/0302425 A1* | 10/2015 | Borger | G06Q 30/0201 |
| | | | 705/7.29 |
| 2016/0232540 A1* | 8/2016 | Gao | G06Q 30/0201 |

* cited by examiner

ESTIMATING PROSPECT LIFETIME VALUES

PRIORITY CLAIM

This U.S. patent application claims priority under 35 U.S.C. § 119 to: India Application No. 762/MUM/2015, filed on Sep. 3, 2015. The entire contents of the aforementioned application are incorporated herein by reference.

TECHNICAL FIELD

The present subject matter relates, in general, to estimating lifetime values and, in particular, to estimating Prospect Lifetime Values (PLTVs).

BACKGROUND

In order to expand theft customer base, organizations are increasingly shifting their marketing strategies from a product-centric approach to a customer-centric approach. However, huge customer acquisition costs are a major concern for the organizations. Customer acquisition cost may be referred to as resources that an organization spends in order to acquire a new customer. To minimize a customer acquisition cost associated with a customer, an organization generally takes into consideration an overall value that the organization may derive from the customer during the association of the customer with the organization. The overall value may be in terms of overall profitability or revenue to be generated by the association of the customer with the organization. The consideration of customer valuation may help the organization to decide how much of its resources can be profitably spent for acquiring the customer. The technical problem addressed by the disclosure is this assigning of lifetime values to prospective customers with greater accuracy using a method for estimation of Prospective Lifetime Value estimation.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Huge customer acquisition costs are a major concern for many organizations. To maximize overall value (commonly referred to as lifetime value) from customers, generally organizations focus on minimizing customer acquisition costs of prospective customers. However, by using this approach, the organizations may spend their time and resources on acquiring prospective customers who generate minimal revenue for the organizations, instead of spending time and resources on prospective customers who are expected to generate considerable amount of revenue for the organizations. For instance, an acquisition cost of a prospective customer may be low; however it is not necessary that the prospective customer would generate revenue for the organization. Therefore, in such scenarios, the organizations spend a lot of time and resources on prospective customers who generate considerably less revenue for the organizations.

At present, a variety of tools are available to estimate lifetime values for prospective customers. For estimating the lifetime values for the prospective customers for an organization, an existing customer base of the organization may be segmented into different segments. Each segment typically includes a large number of existing customers. The segments may be defined by customer age, customer location, customer demographics, and the like. Generally, a prospective customer is tagged to one of the segments to estimate a lifetime value for the prospective customer. Accordingly, an average value of lifetime values associated with the existing customers in that particular segment is assigned to the prospective customer.

Since, typically each segment is of a considerably large size and includes a wide range of customers with different buying behaviors ranging from habitual buyers to complex buyers, variance of lifetime values within each segment may be high. Accordingly, estimation of the lifetime values for the prospective customers based on tagging the prospective customers to the segments wide range of lifetime values for the customers may result in inaccuracies or errors in estimation of the lifetime values for the prospective customers. Further, since the segments based on which the lifetime values for the prospective customers are estimated are large in size, processing load and processing time for the estimation of the lifetime values for the prospective customers are substantially large.

The present subject matter describes systems and methods for estimating Prospect Lifetime Values (PLTVs) for prospective customers. In accordance to an embodiment of the present subject matter, a PLTV for a prospective customer for an organization is estimated using an average value of Customer Lifetime Values (CLTVs) for one or more existing customers of the organization. In an implementation, the one or more existing customers are selected based on a selection such that existing customers that are similar to the prospective customer are selected. Using the average value of the CLTVs for the selected one or more customers for estimating the PLTV for the prospective customer helps in ensuring that the PLTV for the prospective customer is accurately estimated.

According to an implementation of the present subject matter, initially, information related to the prospective customer and a plurality of existing customers of the organization is obtained from one or more data sources. In one example, the information may include demographic variables and customer profile variables pertaining to both the prospective customer and the existing customers.

Subsequently, variables that are common to both the prospective customer and the existing customers are identified from at least one of the demographic variables and the customer profile variables. The variables pertaining to the prospective customer and the existing customers may be referred to as prospective customer data and existing customer data, respectively, hereinafter. In one example, the prospective customer data and the existing customer data may represent a string of values associated with different variables, such as "age-income-gender-occupation-marital_status". As would be understood, although the variables in the prospective customer data and the existing customer data are same, however, values associated with the variables may be different.

Thereafter, a distance of the prospective customers from each of the plurality of existing customers is computed based on the existing customer data and the prospective customer data. In one example, the distance is one of Euclidean distance, Cosine distance, and Chebyshev distance. Subsequently, the distances may be sorted such that an existing customer who is closest to the prospective customer in terms of similarity is placed on the top. Once the distances are computed, one or more existing customers that are similar to the prospective customers are determined from amongst the plurality of customers based on a selection rule. The one or more existing customers may be determined based on the distances. In one example, top three existing customers may be determined from amongst the existing customers.

Further, a PLTV for the prospective customer is estimated. The PLTV is for the prospective customer may be indicative of revenue to be generated by association of the prospective customer with the organization. In one example, the PLTV for the prospective customer may be estimated using an average value of CLTVs for the determined one or more existing customers. CTLV for an existing customer may be indicative of revenue generated by association of the existing customer with the organization. According to an example, an actual number of existing customers for calculation of a PLTV is learnt using a process of minimizing a difference of the PLTV from CLTV on a sample of existing customers for which CLTV is already calculated. For arriving at an accurate estimation of PLTV, the difference between the PLTV and the CLTV has to be minimum.

Although, it has been described that the PLTV is estimated for one prospective customer, PLTV may be estimated for a plurality of prospective customers using the same process as described above.

The present subject matter thus facilitates in accurately estimating the PLTVs for the prospective customers using the average value of the CLTVs for the selected one or more customers. Further, since existing customers that are not similar to the prospective customer are not taken into consideration for estimation of the PLTVs for the prospective customers, the PLTVs for the prospective customers are estimated in substantially less time. Further, processing load for the estimation of lo the PLTVs is also reduced. Thus, according to the present subject matter, the estimation of the PLTVs for the prospective customers is more accurate in comparison to conventional techniques for PLTV estimation, The following disclosure describes a system and a method for estimating PLTVs for a plurality of prospective customers. While aspects of the described system and method can be implemented in any number of different computing systems, environments, and/or configurations, embodiments for estimating PLTVs for the plurality of prospective customers are described in the context of the following exemplary system(s) and method(s).

Figure 1:
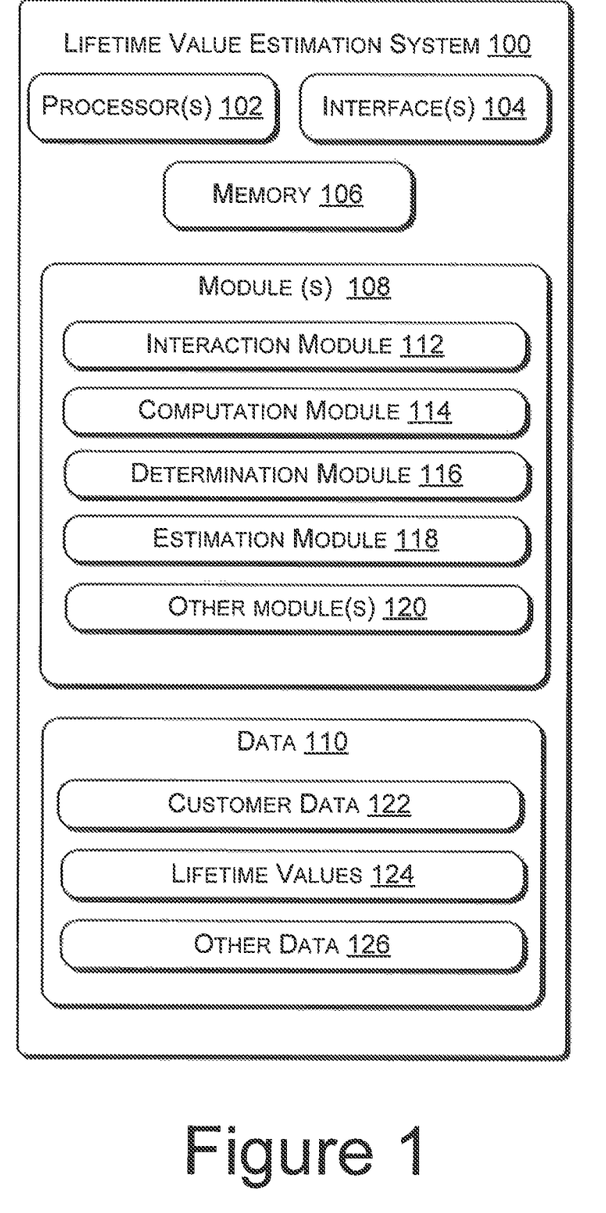
FIG. 1 illustrates a schematic diagram of a lifetime value estimation system for estimating Prospect Lifetime Value (PLTV) for each of prospective customers, according to an embodiment of the present subject matter.

FIG. 1 illustrates a schematic diagram of a lifetime value estimation system 100 for estimating Prospect Lifetime Value (PTLV) for each of a plurality of prospective customers, according to an embodiment of the present subject matter. In one example, PLTV for a prospective customer is indicative of revenue to be generated by association of the prospective customer with the organization.

According to an implementation, the lifetime value estimation system 100 may be implemented in a variety of computing systems, such as a laptop computer, a desktop computer, a notebook, a workstation, a mainframe computer, a server, a network server, and the like. The lifetime value estimation system 100 may be deployed within an organization that wishes to increase its customer base by acquiring additional customers. In one example, the organization may be a banking organization, a telecom organization, and the like.

The lifetime value estimation system 100 includes processor(s) 102, interface(s) 104, and memory 106 coupled to the processor(s) 102. The processor(s) 102 may be implemented as one or more microprocessors, microcomputers, microcontrollers, digital signal processors, central processing units, state machines, logic circuitries, and/or any devices that manipulate signals based on operational instructions. Among other capabilities, the processor(s) 102 may be configured to fetch and execute computer-readable instructions stored in the memory 106.

The memory 106 may include any computer-readable medium known in the art including, for example, volatile memory, such as static random access memory (SRAM), and dynamic random access memory (DRAM), and/or nonvolatile memory, such as read only memory (ROM), erasable programmable ROM, flash memories, hard disks, optical disks, and magnetic tapes.

Further, the interface(s) 104 may include a variety of software and hardware interfaces, for example, interfaces for peripheral device(s), such as a product board, a mouse, an external memory, and a printer. Additionally, the interface(s) 104 may enable the lifetime value estimation system 100 to communicate with other devices, such as web servers and external repositories.

The lifetime value estimation system 100 also includes module(s) 108 and data 110. The module(s) 108 include, for example, an interaction module 112, a computation module 114, a determination module 116, an estimation module 118, and other module(s) 120. The other modules 120 may include programs or coded instructions that supplement applications or functions performed by the lifetime value estimation system 100. The data 110 may include customer data 122, lifetime values 124, and other data 126. Further, the other data 126, amongst other things, may serve as a repository for storing data, which is processed, received, or generated as a result of the execution of one or more modules in the module(s) 108.

Although the data 110 is shown internal to the lifetime value estimation system 100, the data 110 can also be implemented external to the lifetime value estimation system 100, where the data 110 may be stored within a database communicatively coupled to the lifetime value estimation system 100. Further, the data 110 contained within such external database may be periodically updated. For example, new data 110 may be added into the database, existing data 110 may be modified, or non-useful data 110 may be deleted from the database.

In one embodiment of the present subject matter, the lifetime value estimation system 100 is implemented for estimating PLTV for each of the plurality of prospective customers. This may help the organization to formulate an acquisition strategy for acquisition of the prospective customers. According to an implementation, for the purpose of estimating PLTVs for the prospective customers, the interaction module 112 of the lifetime value estimation system 100 may obtain information related to the plurality of prospective customers and a plurality of existing customers of the organization from one or more data sources. Examples of the data sources include, but are not limited to, social media websites, external marketing datasets, and internal database of the organization. In one example, the information may include demographic variables and customer profile variables pertaining to both the prospective customers and the existing customers. For instance, the information may include variables, such as age, gender, income, interest, hobbies, occupation, marital status, mobile handset being used, model of the mobile set, and the like. In this information, the variables, such as age and gender are examples of the demographic variables, and variables, such as mobile handset being used and model of the mobile set are examples of the customer profile variables.

Subsequently, the computation module 114 may identify variables that are common to both the prospective customers and the existing customers from at least one of the demographic variables and the customer profile variables. The variables pertaining to the prospective customers and the existing customers may be referred to as prospective customer data and existing customer data, respectively, hereinafter. Accordingly, the existing customer data includes at least one of existing customer demographic variables and existing customer profile variables, and the prospective customer data includes at least one of prospective customer demographic variables and prospective customer profile variables.

According to an implementation, in case, values of the variables are in a non-numeric format, the computation module 114 may convert the values into a numeric format or a computer-processable format. For instance, a value of a variable "Marital status" may be "Single", then the computation module 114 may convert the non-numeric value "Single" into a numeric format. In one example, the prospective customer data and the existing customer data may represent a string of values associated with different variables, such as "age-income-gender-occupation-marital_status". As would be understood, although the variables in the prospective customer data and the existing customer data are same, however, values associated with the variables may be different. Customers, whether they are prospective or existing, who have same string may behave similarly in future in comparison in comparison to customers who have different strings. In one example, the computation module 114 may store the prospective customer data and the existing customer data in the customer data 122. Further, the customer data 122 may be retrieved to identify existing customers who are most similar to each of the prospective customers. According to an example, if values of demographic variables and customer profile variables for a prospective customer are related to values of demographic variables and customer profile variables for an existing customer, then the prospective customer is said to be similar to the existing customer.

Thereafter, the computation module 114 may compute a distance of each of the plurality of prospective customers from each of the plurality of existing customers. The distance between the prospective customers and the existing customers may be computed based on the existing customer data and the prospective customer data. In one example, the distance is one of Euclidean distance, Cosine distance, and Chebyshev distance. A distance between a prospective customer and an existing customer may represent a similarity measure between the prospective customer and the existing customer. For instance, if a distance between a prospective customer and an existing customer is considerably small, then the distance may represent that the prospective customer is similar to the existing customer. Further, if the distance between the prospective customer and the existing customer is considerably large, then the distance may represent that the prospective customer is not similar to the existing customer.

According to an implementation, Euclidian distance between an existing customer and a prospective customer computed by the computation module 114 is mathematically represented by equation (1) provided below:

$$ED = \sqrt{(X1-X2)^2 + (Y1-Y2)^2} \qquad (1)$$

where ED represents Euclidian distance, X1 represents an age of the existing customer, X2 represents an age of the prospective customer, Y1 represents an income of the existing customer, and Y2 represents an income of the prospective customer.

According to the above equation (1), in one example, if an existing customer $E_1$ has age equal to 30 and income equal to 1000, a prospective customer $P_1$ has age equal to 31 and income equal 1100, and another prospective customer $P_2$ has age equal to 65 and income equal to 3000, then the Euclidian distance between the existing customer $E_1$ and $P_1$ is equal to 100.005 and the Euclidian distance between the existing customer $E_1$ and $P_2$ is equal to 2000. Further, if the distance between the prospective customer and the existing customer is considerably large, then the distance may represent that the prospective customer is not similar to the existing customer. Accordingly, in said example, the prospective customer $P_1$ is more similar to the existing customer $E_1$ in comparison to the prospective customer $P_2$ as the Euclidian distance between the existing customer $E_1$ and the prospective customer $P_1$ is smaller than the Euclidian distance between the existing customer $E_1$ and the prospective customer $P_2$.

Subsequently, the computation module 114 may generate distance vectors for the plurality of prospective customers. A distance vector for a prospective customer includes a set of distances of the prospective customer from the plurality of existing customers. For example, if there are 100 existing customers and 3 prospective customers, then the computation module 114 computes the distance of each of the 3 prospective customers from each of the 100 existing customers to generate 3 vectors $V_1$, $V_2$, and $V_3$ of length 100. In the context of the present subject matter, the distance vectors are mathematically represented by expression (2) provided below:

$$V_1 = [P_1 \times E_1, P_1 \times E_2, \ldots, P_1 \times E_N] \qquad (2)$$
$$V_2 = [P_2 \times E_1, P_2 \times E_2, \ldots, P_2 \times E_N]$$
$$\vdots$$
$$V_M = [P_M \times E_1, P_M \times E_2, \ldots, P_M \times E_N]$$

where V represents a distance vector, P represents a prospective customer, E represents an existing customer, P×E represents a distance between a prospective customer and an existing customer, M represents a total number of prospective customers, and N represents a total number of existing customers.

Accordingly, if there are N existing customers, then for each prospective customer, a distance vector V of N distances is generated. Once the distance vectors are generated, the computation module 114 may sort the distance vectors. In one example, a distance having a smallest value is placed at the top and a distance having a largest value is placed at the bottom. Thus, a distance vector may be so sorted such that an existing customer who is closest to the prospective customer in terms of similarity is placed on the top in the distance vector.

Subsequently, the determination module 116 may determine one or more existing customers from amongst the plurality of existing customers for each of the plurality of prospective customers. The determination module 116 may determine the one or more existing customers based on a selection rule and the distances, such that the determined one or more existing customers are similar to respective prospective customer. In one example, the selection rule may include selecting a pre-defined number of existing customers from amongst the plurality of existing customers. A value of the pre-defined number of the existing customers may be determined using k-Nearest Neighbors (KNN) algorithm. Accordingly, the pre-defined number may be denoted by K. The 'K' in the KNN algorithm may be indicative of a number of existing customers to be selected from amongst a plurality of existing customers for estimation of PLTV of a prospective customer.

According to an example, if K is equal to 4, the determination module 116 may select top 4 existing customers from the distance vectors for each of the prospective customers. The selected existing customers may be referred to as nearest neighbors. According to an implementation, the value of K may depend on minimizing the Mean Absolute Percentage Error (MAPE) on the prospective customer data and the existing customer data. The value which gives minimum MAPE on the prospective customer data and the existing customer data is chosen for selecting the existing customers.

In another example, the selection rule may include comparing the distances between the plurality of prospective customers and the plurality of existing customers with a pre-determined threshold distance value. All the existing customers who fall within the pre-determined threshold distance value may be selected as the one or more existing customers. For instance, if the pre-determined threshold distance value is 5 units, then the determination module 116 for each prospective customer, may select those existing customers from a corresponding distance vector whose distances from the prospective customers are within 5 units. In one example, the threshold distance value is determined by first identifying the value of K which is the value which minimizes the MAPE. Once the value of the K is identified, distance between the prospective customer and the $K^{th}$ existing customer is taken into consideration such that if there is a $(K+1)^{th}$ existing customer who has the same distance as the $K^{th}$ existing customer from the prospective customer, then the $(K+1)^{th}$ customer is also included in the estimation of the average of the CLTV to arrive at the PLTV.

Thereafter, the estimation module 118 may compute Customer Lifetime Value (CLTV) for each of the plurality of existing customers. In one example, the estimation module 118 may compute the CLTV using one of a survival regression model, a logistic regression model, and a distributed based model. CLTV for an existing customer may be indicative of revenue generated by association of the existing customer with the organization. Further, the estimation module 118 calculates an average value of the CLTVs for the respective one or more existing customers. For instance, if for a prospective customer, 4 existing customers are selected, then the determination module 116 may calculate the average value of the CLTVs for the 4 existing customers. In one example, the determination module 116 may calculate a simple average of the CLTVs for all the existing customers identified for a prospective customer. In another example, the determination module 116 may calculate a weighted average of the CLTVs for all the existing customers identified for a prospective customer. In said example, the weight may be an inverse of a distance between the prospective customer and an existing customer.

Subsequently, the estimation module 118 estimates the PLTV for each of the plurality of prospective customers using the average value of CLTVs for respective one or more existing customers that were determined based on the selection rule. The estimated PLTVs are the functions of the CLTVs for the existing customers.

As described earlier, the value of K which gives minimum MAPF on the prospective customer data and the existing customer data is chosen for selecting the existing customers. To determine the scalar value K, the determination module 116 may use an iterative process, where the objective of the process may be to minimize an error in the PLTV estimation. Initially, the K is taken to be equal to 1 to begin with. Thereafter, a distance vector $V_M$ is sorted by the values $P_M E_N$. Since K=1, one nearest existing customer corresponding to the lowest $P_M E_N$ may be selected, and the PLTV of the prospective customer may be estimated to be the CLTV for this existing customer. Further, if K=2 then 2 existing customers with least 2 $P_M E_N$ distance may be selected, and the PLTV of the prospective customer may be estimated to be the average of the CLTV's for the 2 existing customer. For each iteration of K, the determination module 116 may also estimate an error in estimation of the PLTV. This may be done by executing the above process on the prospective customer data and the existing customer data. The choice of K which yields least error on the prospective customer data and the existing customer data is chosen to be the right K.

Taking an example of a set of existing customers, where the set is divided into 2 segments, it is assumed that first segment includes prospective customers and the second segment includes existing customers. Now, using the prospective customer data and the existing customer data, distances between the imaginary prospective customers in the first segment and all the existing customers in the second segment are computed. However, since all the imaginary prospective customers in the first segment have CLTVs, thus the PLTVs for the prospective customers estimated by the determination module 116 may be checked against the already known CLTVs. The difference between the values may be referred to as error. This error is thus estimated and aggregated for all the customers in the first segment. Also, this error is estimated for various choices of K=1,2,3,4,5,6, 7,8,9, etc. The K which gives the least overall error is taken to be the right choice of K.

Continuing with the present implementation, once the PLTVs are estimated, the estimation module 118 ranks the plurality of prospective customers based on the PLTV for each of the plurality of prospective customers. For example, if there are 100 prospective customers, then the estimation module 118 may rank the 100 prospective customers from 1 to 100 based on their PLTVs. Further, the estimation module 118 may shortlist one or more prospective customers based on the ranking. This helps the organization to direct the acquisition efforts. For instance, the organization may spend its marketing budget on trying to acquire those prospective customers who have higher PLTV.

Therefore, reliable estimation of the PLTVs for the prospective customers using the CLTVs for the existing customers facilitates in minimizing the error by iterating on an optimal number of nearest existing customers. As a result, the estimated PLTVs are accurate and granular. Further, this helps the organization target the right set of prospective customers for acquisition, and also enables the organization to generate a substantially higher return on investment of its marketing budget.

Figure 2:
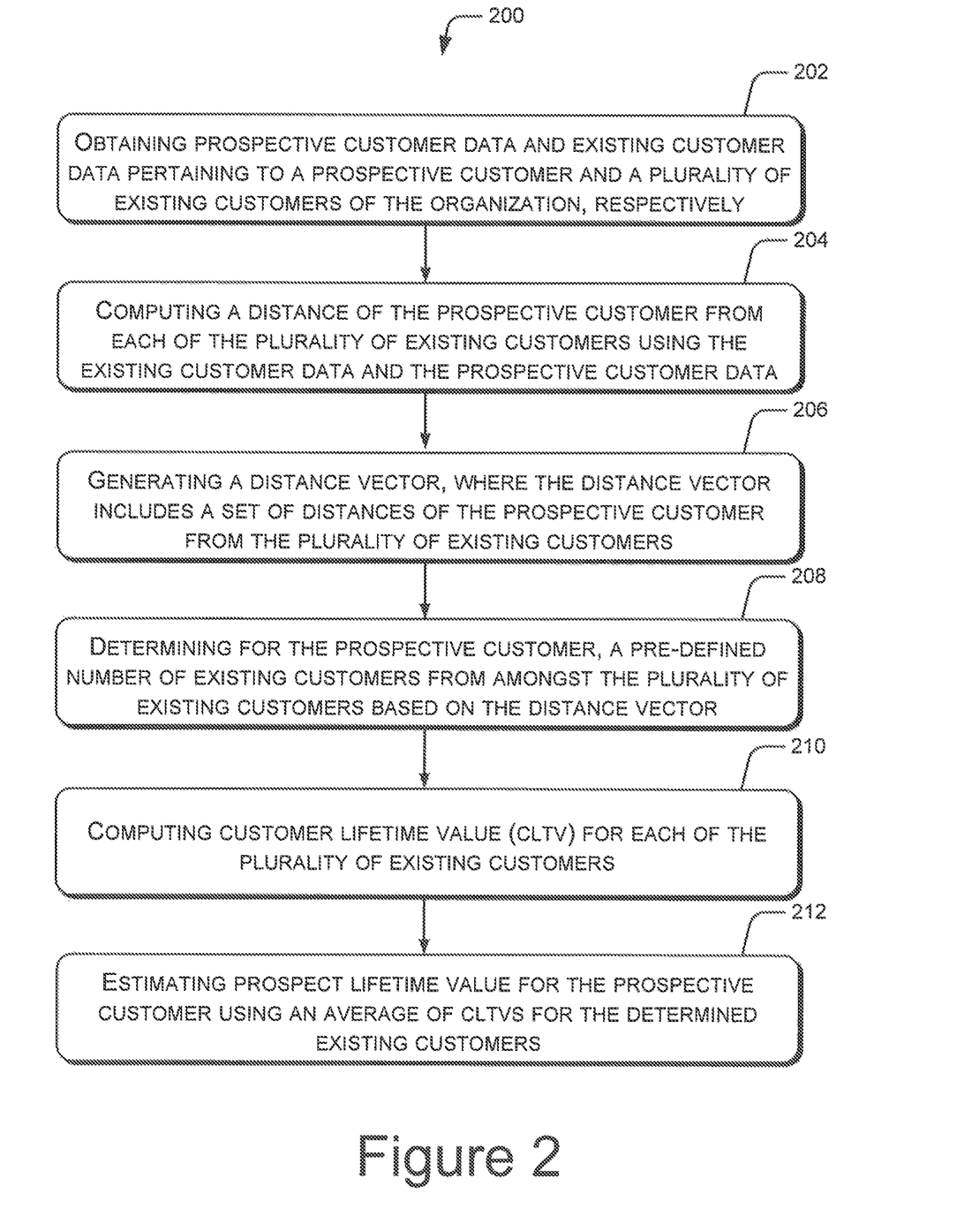
FIG. 2 illustrates a method for estimating the PLTV for each of the prospective customers, according to an embodiment of the present subject matter.

FIG. 2 illustrates a method 200 for estimating PLTV for each of prospective customers, according to an embodiment of the present subject matter. The method 200 may be described in the general context of computer executable instructions. Generally, computer executable instructions can include routines, programs, objects, components, data structures, procedures, modules, functions, etc., that perform particular functions or implement particular abstract data types. The method 200 may also be practiced in a distributed computing environment where functions are performed by remote processing devices that are linked through a communications network.

The order in which the method 200 is described is not intended to be construed as a limitation, and any number of the described method blocks can be combined in any order to implement the method 200, or an alternative method. Furthermore, the method 200 can be implemented in any suitable hardware, software, firmware or combination thereof.

At block 202, the method 200 includes obtaining prospective customer data and existing customer data pertaining to a prospective customer and a plurality of existing customers of the organization, respectively. In one example, the prospective customer data and the existing customer data may be identified from information related to the prospective customer and the plurality of existing customers. The information may include demographic variables and customer profile variables pertaining to both the prospective customer and the existing customers. Accordingly, the existing customer data includes at least one of existing customer demographic variables and existing customer profile variables. Further, the prospective customer data includes at least one of prospective customer demographic variables and prospective customer profile variables. In accordance with one implementation of the present subject matter, the computation module 114 may obtain the prospective customer data and the existing customer data pertaining to the prospective customer and the plurality of existing customers of the organization.

At block 204, the method 200 includes computing a distance of the prospective customer from each of the plurality of existing customers using the existing customer data and the prospective customer data. In one example, the distance is one of Euclidean distance, Cosine distance, and Chebyshev distance. According to an implementation, the computation module 114 may compute a distance of the prospective customer from each of the plurality of existing customers.

At block 206, the method 200 includes generating a distance vector, where the distance vector includes a set of distances of the prospective customer from the plurality of existing customers. In one example, if there are N existing customers, then a distance vector V of N distances is generated for the prospective customer. According to an implementation, the computation module 114 may generate a distance vector for prospective customer.

At block 208, the method 200 includes determining for the prospective customer, a pre-defined number of existing customers from amongst the plurality of existing customers based on the distance vector. In one example, a value of the pre-defined number of the existing customers is determined using k-Nearest Neighbors (KNN) algorithm. The pre-defined number may be denoted by K. The 'K' in the KNN algorithm may be indicative of a number of existing customers to be selected from amongst a plurality of existing customers for estimation of PLTV of a prospective customer. In one implementation, the determination module 116 may determine the pre-defined number of existing customers from amongst the plurality of existing customers based on the distance vector.

At block 210, the method 200 includes computing CLTV for each of the plurality of existing customers. The CLTV for each of the plurality of existing customers may be computed using a CLTV model. Examples of the CLTV model include, but are not limited to, a survival regression model, a logistic regression model, and a distributed based model. In one example, the estimation module 118 may compute the CLTV for each of the plurality of existing customers.

At block 212, the method 200 includes estimating prospect lifetime value for the prospective customer using an average of CLTVs for the determined existing customers. The estimated PLTV is the function of the CLTVs for the existing customers. According to an implementation, the estimation module 118 estimates the PLTV for the prospective customer using the average value of CLTVs for the determined existing customers.

Although, the above method 200 is described with respect to one prospective customer, PLTV may be estimated for a plurality of prospective customers using the same steps as described above. Accordingly, PLTV for each of the plurality of prospective customers is estimated.

Although embodiments for methods and systems for estimating prospect lifetime values have been described in a language specific to structural features and/or methods, it is to be understood that the present subject matter is not necessarily limited to the specific features or methods described. Rather, the specific features and methods are disclosed as exemplary embodiments for estimating prospect lifetime values.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a" "an," and "the" include plural references unless the context clearly dictates otherwise, Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A system (100), implemented on a server, for accurately estimating and assigning Prospect Lifetime Values (PLTVs) for a plurality of prospective customers using a large existing customer base of an organization, the lifetime value estimation system (100) comprising:
   a processor (102); and
   a memory 106 coupled to the processor 102, wherein the processor 102 executes a plurality of modules 108 stored in the memory 106, and wherein the plurality of modules 108 comprises:
   an interaction module (112) to obtain, from one or more data sources, information related to the plurality of prospective customers and a plurality of existing customers of the organization, wherein the data sources include one or more of social media websites, external marketing datasets, and internal database of the organization;
   a computation module (114) to,
      identify existing customer data and prospective customer data that are common to both prospective customers and existing customers from the obtained information, wherein the existing customer data and the prospective customer data represent a string of values associated with different variables, and wherein the variables received in a non-numeric format are converted into a numeric value or a computer-processable format;
      compute a distance of each of the plurality of prospective customers from each of the plurality of existing customers of the organization using the existing customer data and the prospective customer data, wherein a large computed distance represent that the prospective customer is not similar to the existing customer;
      generate distance vectors for the plurality of prospective customers, wherein a distance vector for the prospective customer includes a set of distances of the prospective customer from the plurality of existing customers;
      sort the generated distance vectors such that an existing customer who is closest to the prospective customer in terms of similarity is placed on top in the distance vector;
   a determination module (116) to,
      reduce processing time and processing load used for accurately estimating PLTVs from the large existing customer base of the organization, wherein the processing time and processing load are reduced by, determining for each of the plurality of prospective customers, one or more existing customers from amongst the plurality of existing customers based on a selection rule and the distance, such that the determined one or more existing customers are similar to respective prospective customer, wherein the selection rule includes one of:
         comparing the distances between the plurality of prospective customers and the plurality of existing customers with a pre-determined threshold distance value; and
         selecting a pre-defined number of existing customers from amongst the plurality of existing customers, wherein a value of the pre-defined number of the existing customers is determined using k-Nearest Neighbors (KNN) algorithm by iterating on an optimal number of nearest existing customers in order to minimizes the Mean Absolute Percentage Error (MAPE) on the prospective customer data and the existing customer data; and
   an estimation module (118) to,
      estimate and assign a PLTV for each of the plurality of prospective customers using an average value of Customer Lifetime Values (CLTVs) for respective one or more existing customers that were determined based on the selection rule, wherein the PLTV for a prospective customer is indicative of revenue to be generated by association of the prospective customer with the organization, and wherein the CLTV for an existing customer is indicative of revenue generated by association of the existing customer with the organization;
   a database to store the estimated PLTV values, the existing customer data, the prospective customer data and data generated as a result of execution of the plurality of modules, and wherein the database is periodically updated.

2. The lifetime value estimation system (100) of claim 1, wherein the estimation module (118) further computes the CLTV for each of the plurality of existing customers using one of a survival regression model, a logistic regression model, and a distributed based model.

3. The lifetime value estimation system (100) of claim 1, wherein the estimation module (118) further calculates the average value of the CLTVs for the respective one or more existing customers.

4. The lifetime value estimation system (100) of claim 1, wherein the distance is one of Euclidean distance, Cosine distance, and Chebyshev distance.

5. A method, implemented on a server, for accurately estimating and assigning Prospect Lifetime Values (PLTVs) for a plurality of prospective customers using a large existing customer base of an organization, the method comprising:
   obtaining, via one or more hardware processors, information related to the plurality of prospective customers and a plurality of existing customers of the organization from one or more data sources, wherein the data sources includes one or more of social media websites, external marketing datasets, and internal database of the organization;
   identifying existing customer data and prospective customer data that are common to both prospective customers and existing customers from the obtained information, wherein the existing customer data and the prospective customer data represent a string of values associated with different variables, and wherein the variables received in a non-numeric format are converted into a numeric value or a computer-processable format;

computing, via one or more hardware processors, a distance of the prospective customer from each of the plurality of existing customers of the organization using the existing customer data and the prospective customer data, wherein a large computed distance represent that the prospective customer is not similar to the existing customer;

generating distance vectors for the plurality of prospective customers, wherein a distance vector for the prospective customer includes a set of distances of the prospective customer from the plurality of existing customers;

sorting the generated distance vectors such that an existing customer who is closest to the prospective customer in terms of similarity is placed on top in the distance vector;

reducing processing time and processing load used for accurately estimating PLTVs from the large existing customer base of the organization, wherein the processing time and processing load are reduced by, determining, via the one or more hardware processors, for the prospective customer, a pre-defined number of existing customers from amongst the plurality of existing customers, based on the distance and a selection rule, such that the determined pre-defined number of existing customers are similar to the respective prospective customer, wherein the selection rule includes one of:

comparing the distances between the plurality of prospective customers and the plurality of existing customers with a pre-determined threshold distance value; and selecting the pre-defined number of existing customers from amongst the plurality of existing customers, wherein a value of the pre-defined number of the existing customers is determined using k-Nearest Neighbors (KNN) algorithm by iterating on an optimal number of nearest existing customers in order to minimizes the Mean Absolute Percentage Error (MAPE) on the prospective customer data and the existing customer data;

estimating and assigning, via the one or more hardware processors, the PLTV for the prospective customer using an average of Customer Lifetime Values (CLTVs) for the existing customers determined based on the selection rule, wherein PLTV for the prospective customer is indicative of revenue to be generated by association of the prospective customer with the organization, and wherein CLTV for an existing customer is indicative of revenue generated by association of the existing customer with the organization;

periodically updating a database to store the estimated PLTV values, the existing customer data, the prospective customer data and data generated as a result of execution of the one or more hardware processors.

6. The method of claim 5, wherein the distance is one of Euclidean distance, Cosine distance, and Chebyshev distance.

7. The method of claim 5, wherein the method further comprises:
computing CLTV for each of the plurality of existing customers using one of a survival regression model, a logistic regression model, and a distributed based model.

8. The method of claim 5, wherein the method further comprises:
calculating the average value of the CLTVs for the determined existing customers.

9. A non-transitory computer-readable medium having embodied thereon a computer program for executing a method, implemented on a server, comprising:

obtaining, via one or more hardware processors, information related to the plurality of prospective customers and a plurality of existing customers of the organization from one or more data sources, wherein the data sources includes one or more of social media websites, external marketing datasets, and internal database of the organization;

identifying existing customer data and prospective customer data that are common to both prospective customers and existing customers from the obtained information, wherein the existing customer data and the prospective customer data represent a string of values associated with different variables, and wherein the variables received in a non-numeric format are converted into a numeric value or a computer-processable format;

computing, via one or more hardware processors, a distance of the prospective customer from each of the plurality of existing customers of the organization using the existing customer data and the prospective customer data, wherein a large computed distance represent that the prospective customer is not similar to the existing customer;

generating distance vectors for the plurality of prospective customers, wherein a distance vector for the prospective customer includes a set of distances of the prospective customer from the plurality of existing customers;

sorting the generated distance vectors such that an existing customer who is closest to the prospective customer in terms of similarity is placed on top in the distance vector;

reducing processing time and processing load used for accurately estimating PLTVs from the large existing customer base of the organization, wherein the processing time and processing load are reduced by, determining, via the one or more hardware processors, for the prospective customer, a pre-defined number of existing customers from amongst the plurality of existing customers based on the distance and a selection rule, such that the determined one or more existing customers are similar to the respective prospective customer, wherein the selection rule includes one of:

comparing the distances between the plurality of prospective customers and the plurality of existing customers with a pre-determined threshold distance value; and selecting the pre-defined number of existing customers from amongst the plurality of existing customers, wherein a value of the pre-defined number of the existing customers is determined using k-Nearest Neighbors (KNN) algorithm by iterating on an optimal number of nearest existing customers in order to minimizes the Mean Absolute Percentage Error (MAPE) on the prospective customer data and the existing customer data;

estimating and assigning, via the one or more hardware processors, the PLTV for the prospective customer using an average of Customer Lifetime Values (CLTVs) for the existing customers determined based on the selection rule, wherein PLTV for the prospective customer is indicative of revenue to be generated by association of the prospective customer with the organization, and wherein CLTV for an existing customer is indicative of revenue generated by association of the existing customer with the organization;

periodically updating a database to store the estimated PLTV values, the existing customer data, the prospective customer data and data generated as a result of execution of the one or more hardware processors.

* * * * *